March 30, 1937.   J. R. FERGUSON   2,075,032
CLUTCH CONTROL MECHANISM
Filed May 11, 1934
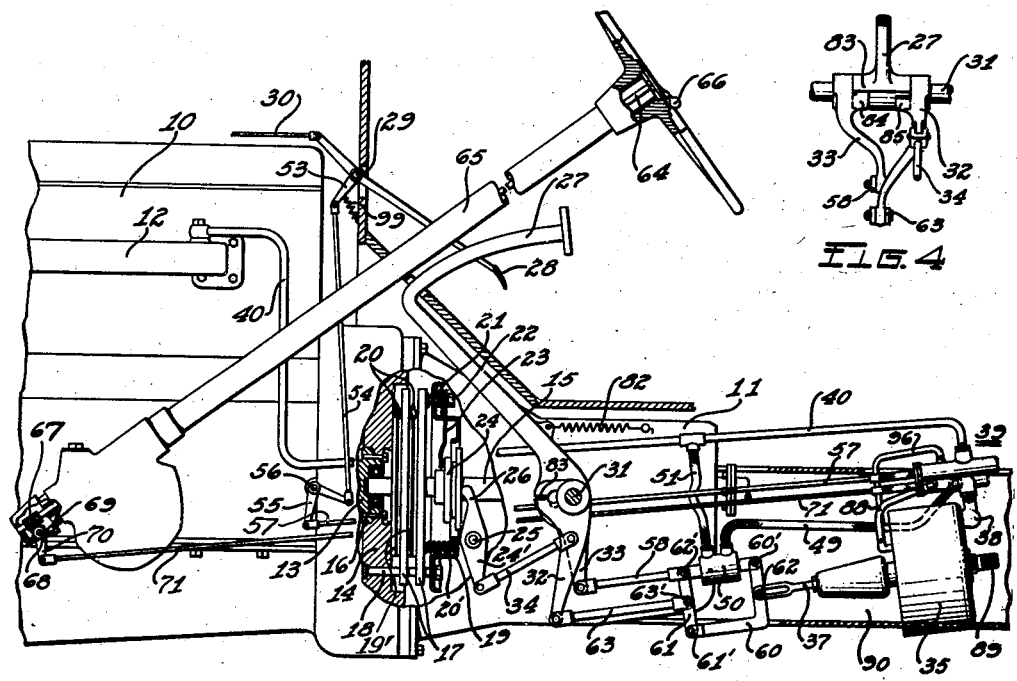
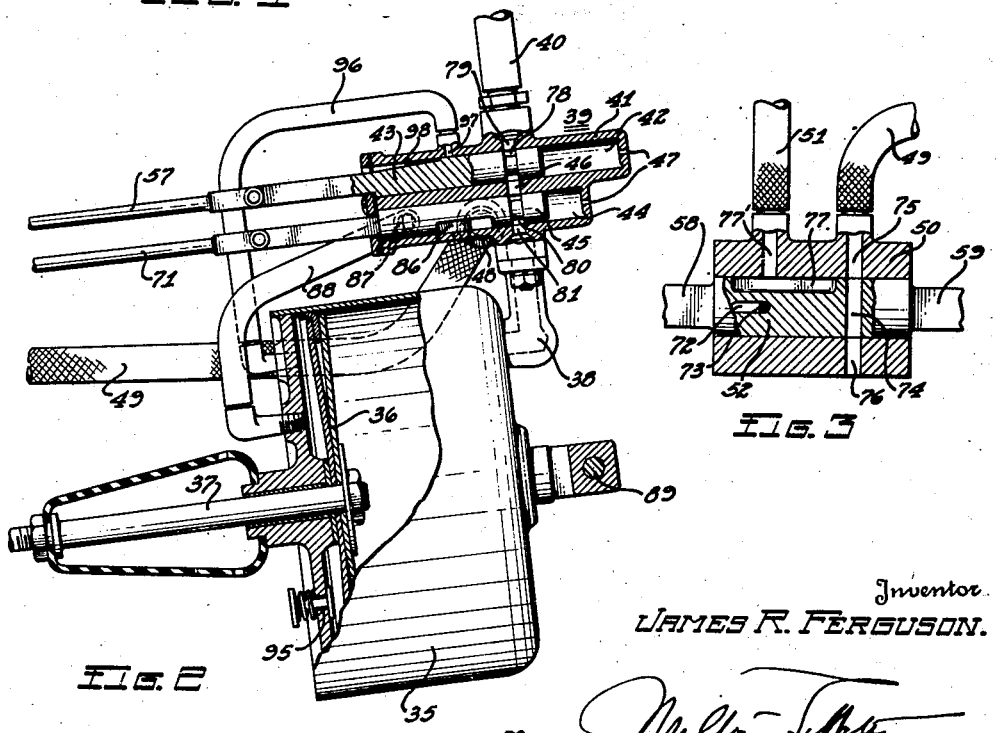
Inventor
JAMES R. FERGUSON.

Patented Mar. 30, 1937

2,075,032

UNITED STATES PATENT OFFICE 2,075,032

CLUTCH CONTROL MECHANISM

James R. Ferguson, Royal Oak, Mich., assignor to Packard Motor Car Company, Detroit, Mich., a corporation of Michigan Application May 11, 1934, Serial No. 725,121

15 Claims. (Cl. 192—.01)

This invention relates to motor vehicles and more particularly to clutch control mechanism.

In the operation of motor vehicles, power from the motor is usually transmitted to a driving shaft through means of a friction clutch having springs normally holding the friction elements in engaged or driving relation. The spring pressure to be overcome in disengaging the clutch elements, usually for the purpose of shifting gears, is of a character such that the effort required to perform this operation is very tiring when driving in the city or in heavy traffic.

An object of this invention is to provide a clutch operating system which can be controlled by a minimum manual effort.

Another object of the invention is to provide a system of the character set forth in which the clutch mechanism release is obtained entirely by means having a dual manual control.

Another object of the invention is to provide a clutch mechanism wherein release is obtained by power operated means controlled by two selective manually operated means.

A further object of the invention is to provide a clutch mechanism in which release is obtained entirely manually or by power operated mechanism controlled by either a manually actuated clutch pedal or accelerator pedal.

Another object of the invention is to provide novel regulating means for controlling the operation of power mechanism connected to release a clutch.

Other objects of the invention will appear from the folllowing description taken in connection with the drawing, which forms a part of this specification, and in which:

Fig. 1 is a side elevational view of a fragment of a motor vehicle, partly in section and partly broken away, having clutch control mechanism associated therewith constructed in accordance with my invention;

Fig. 2 is a fragmentary elevational view of a portion of the clutch control mechanism, partly in section and partly broken away, showing the valve control for the power means;

Fig. 3 is a sectional view of the valve control means actuated by the clutch pedal;

Fig. 4 is a fragmentary front elevational view of the clutch pedal and its associated mechanism.

Referring now to the drawing by characters of reference, 10 indicates generally a motor serving as the power unit for a vehicle with which is connected a transmission indicated generally at 11. Associated with the motor is the usual fuel intake manifold 12 and crankshaft 13, a flywheel 14 being secured to the shaft. A driven shaft 15 has its forward end projecting into a recess in the rear face of the flywheel and rotatably mounted therein in a bearing 16.

Between the driven shaft and the flywheel is arranged a conventional form of disc clutch. Thrust rings 17 and a back plate 19 are mounted on retainer bolts 18 which are fixed to the flywheel. Between the rings and also between the flywheel and the ring adjacent thereto are driving discs 19' having friction elements 20 fiixed on opposite faces thereof. The discs are fixed to the driven shaft and the clutch is normally held in engaged position by springs 20'. Bolts 22 are secured to the rear plate 17 and extend through openings in the back plate. Control members 23 are carried on the bolts 22 and project through openings in the back plate 19 into the path of a throw-out collar or release element 24 slidably mounted on shaft 15 to engage and rock the members 23 so that the bolts 22 are moved rearwardly to release the friction plates. Springs 21 surround the bolts and exert pressure to hold the control members against the bolt heads. Lever 24' is pivotally mounted upon a shaft 25 carried by the transmission casing and has a yoke portion 26 adapted to straddle the driving shaft and engage the rear face of the release element 24. As the yoke is rocked forwardly, it moves the inner end of the members 23 forwardly therewith and, because of their rocking engagement with the back plate, the outer ends of the members 23 are moved rearwardly carrying the bolts 22 and the attached rear plate 17 therewith so that the friction elements of the clutch are disengaged. When the force tending to move the yoke 26 forwardly is released, the springs 20' exert sufficient force to return the plates 17 into a relation whereby the friction elements 20 are held in driving engagement.

With the clutch disengaging lever 24', I propose to connect actuating mechanism which can be operated entirely manually or by power mechanism controlled by either of two manually operable elements, such as the usual clutch pedal 27 and accelerator pedal 28, in conjunction with a selector. The accelerator pedal is fixed upon a shaft 29 suitably mounted on the motor vehicle and linkage, as indicated at 30, extends forwardly from the shaft to the carburetor (not shown) so that, by rocking the accelerator pedal, the linkage 30 will control the fuel mixture. The clutch pedal 27 is pivotally mounted on a shaft 31 fixed to the transmission casing and rotatably mounted upon such shaft at the ends of the clutch pedal hub I provide links 32 and 33, the lever 24' being connected with the link 32 by a rod 34.

The power mechanism for operating the clutch release mechanism includes a cylinder 35 having a piston 36 therein connected to a rod 37 which extends through the forward end of the cylinder. The rear end of the cylinder is provided with an extension which is pivotally mounted upon a shaft 89 supported by the side sills of the vehicle frame, one of which is indicated at 90. A union 38 is associated with the rear wall of the power cylinder and is connected with the intake manifold 12 by means of a valve structure, indicated generally at 39, and conduit means 40. This valve structure includes a housing 41 having a chamber 42 therein in which a valve element 43 is slidable and another chamber 44 in which a valve element 45 is slidable. There is a port 46 in the housing wall between the chambers through which communication between the connection 38 and the conduit 40 is established. The housing wall at the rear of the chambers 42 and 44 is provided with openings 47 to form air vents. A connection 48 is associated with the chamber 44 and a conduit 49 extends from this connection to a valve housing 50, and another conduit 51 extends from this valve housing to the conduit 40 which extends from the manifold 12 to the valve housing 39. Within the valve housing 50 a valve member 52 is slidably mounted.

Control mechanism is provided between the accelerator pedal shaft 29 and the valve 43. An arm 53 is fixed to rotate with the shaft 29 and is connected to reciprocate a rod 54 which is pivotally connected to a bell crank 55 mounted on a shaft 56 fixed to a portion of the engine. Connecting the bell crank and the valve member 43 is a rod 57. A spring 99 is associated with the arm 53 to normally maintain it in a relation where the accelerator pedal is in a position such that the engine will idle, as illustrated in Fig. 1. The valve 52 is connected by a rod 58 with the link member 33 and at the rear end of such valve there is an extension 59. An L-shaped link 60 is pivoted at 60' to the valve extension and is pivoted at 61' to a link 61 which, in turn, is pivoted at 62' to the rod 58. The rod 37 is provided with a slotted end through which projects a pin 62 fixed to the rear portion of the L-shaped link. Pivoted at 63', substantially midway on the link 61, is a rod 63 which is pivoted at its forward end to the link 32. The linkage consisting of the rod 37, the rod 58 and valve 52, and the links 60, 61 and 63 forms a connection between the piston in the power cylinder and the link 32 and provides the mechanism for actuating the throw-out lever yoke 26. Movement of the piston rearwardly will cause such mechanism to rock the yoke forwardly and move the throw-out collar 24 therewith so that the clutch discs are separated and the friction members disengaged. When the action of the vacuum upon the piston is cut off, the clutch is placed in driving relation by the springs 20' and the yoke 26 is moved rearwardly, thus moving the link 32 and the associated mechanism between it and the piston in the same direction.

The manifold connection with the power cylinder is selectively controlled by either mechanism connected with the accelerator pedal or the clutch pedal in cooperation with an adjustable selector means. This selector means includes a shaft 64, extending through the steering column 65, having a lever 66 attached to the end thereof for manipulation by the driver of the vehicle. The gear 67 is fixed to the lower end of the shaft 64 and meshes with another gear 68 fixed on a shaft 69 suitably carried by the steering gear housing. On the shaft 69 is fixed an arm 70 which is connected with the valve 45 by a rod 71. When the arm 66 is swung to rotate the shaft 64, the gears 67 and 68 will rotate thereby rotating the shaft 69 and rocking the arm 70 to reciprocate the rod 71 and the valve 45, thus controlling the vacuum connections between the power cylinder and the intake manifold.

The valve 52 is provided with a slot 72 through which extends a pin 73 fixed to the valve housing 50 so that the movement of the valve will be in a definite path and of a limited character with respect to the housing. The valve 52 is also provided with a transversely extending passage 74 which is adapted to register with the inlet port 75 connected with the conduit 49 and with another passage 76 which is open to atmosphere. A longitudinally extending recess 77 is formed in the periphery of the valve 52 and is of such length that it will establish communication within the valve housing between the inlet port 75 and the outlet port 77' which communicates with the conduit 51.

The valve 43 is formed with a peripheral groove 78 adapted to register with the port 46 in the wall between the chambers 42 and 44 and with the inlet passage 79 in the valve housing 41. The valve 45 is provided with a peripheral recess 80 which is adapted to register with the port 46 and the port 81 with which the connection 38 communicates.

The clutch pedal is normally maintained in its rearmost position by a coil spring 82 which exerts just sufficient effort for this purpose. There is a boss 83 extending axially along the hub of the pedal 27 which engages with a boss 84 projecting from the hub of the link 33 and normally spaced from but adapted to engage with a boss 85 projecting from the link 32. Forward movement of the clutch pedal 27 will swing the boss 83 downwardly and, through its engagement with the boss 84, will swing the link 33 rearwardly, thus moving the valve 52 into a position in its housing so that the recess 77 will establish communication between the ports 75 and 77'. In the event that vacuum fails for any reason, the boss 83 on the pedal hub will engage the boss 85 on the link 32 and swing such link rearwardly when manual pressure is applied to the pedal so that the link 34 will be pulled backwardly and thus rock the yoke 26 to disengage the clutch.

The chamber 44 is provided with a port, as indicated at 87, which will be uncovered when the valve 45 is moved into a position to establish communication between the conduit 49 and the port 81 leading to the connection 38. With this port 87 there is associated a pipe connection 88 leading to the forward end of the power cylinder so that air drawn into the cylinder through the one-way port 95 can be exhausted after the vacuum connection with the piston is broken. A similar conduit 96 connects the front end of the cylinder with the chamber 42 through a port 97 in the valve housing and the valve 43 in this instance is formed with a tapered portion 98 so that, as it moves rearwardly cutting off vacuum to the power cylinder, the escape of air from the cylinder will be gradual and thus prevent the clutch from grabbing while engaging. Both of the ports 87 and 97 are open to atmosphere, when uncovered, through openings in the forward end of the valve housing 41.

When the clutch is to be disengaged by the power means under the control of the selector means and the mechanism connected with the accelerator pedal 28, it is first necessary that the pedal be released so that it is in its uppermost position. Under such condition, through means of rod 57 and the mechanism between the rod and the arm 53, the valve 43 will be placed at the forward end of chamber 42 so that the recess 78 registers with ports 46 and 79. The lever 66 is then moved into one extreme position of its range of adjustment so that the associated mechanism will place the valve 45 at the forward end of the chamber 44 with the recess 80 registering with ports 46 and 81. In this manner, the conduit 40 is placed in communication with the interior of the rear end of the power cylinder 35 and pressure differential will move the piston to the right. During such movement of the piston, the one-way port 95 will be open to atmosphere and, upon disconnection of the vacuum from the power cylinder by movement of either valve 43 or 45, air in the forward end of the power cylinder will escape through the conduit 96 or the conduit 88 depending on which of the valves 43 or 45 is moved rearwardly. Rearward movement of the piston will move the mechanism, including the rod 37, the links 60, 61 and 63, therewith and thereby swing the link 32 rearwardly together with the rod 34 which will rock the lever 24' so that the yoke 26 moves forwardly and disconnects the clutch. In Fig. 2, the mechanism is shown in position with the valves just establishing communication between the conduit 40 and the power cylinder, with the piston in position where it is just ready to be operated by the pressure differential.

When the throw-out mechanism is to be power actuated under control of the clutch pedal 27, the selector mechanism must be adjusted so that the lever 66 is in the other end of its range of movement from that in which it is located when the mechanism connected to the accelerator pedal is effective for controlling. Under such circumstances, the shaft 64 has been rotated and, through means of the gears 67 and 68, the shaft 69 has been rotated and has swung the arm 70 and shifted the rod 71 placing the valve 45 rearwardly in the chamber 44. Such movement of the valve 45 shuts off the port 46 and establishes communication between the conduit 49 and the port 81 through means of the recess 86. When the valve 45 is in the position just described, depression of the clutch pedal will establish communication between the conduits 51 and 49 through moving the valve 52 in the housing 50 so that port 76 is closed and recess 77 is open to ports 77' and 75. Inward movement of the clutch pedal 27, which requires very light pressure to overcome the spring 82, will rock the lever 33 therewith, due to engagement of boss 83 with boss 84, and will move the valve rod 58 rearwardly in the housing 50 to place the recess 77 in position establishing communication between the conduits 49 and 51 so that the cylinder is open to the manifold. Rearward movement of the rod 58 carries the pivot 62' therewith and the link 61 rocks on pivot 63', because of the tendency of the clutch spring force to hold the pivot 63' stationary, and the link 60 is also rocked by the movement of the rod 58 and link 61. Upon establishing communication between the cylinder and the manifold, the piston will be moved by power to the right and will pull the link 60 therewith which will move the link 63 therewith and disengage the clutch. This movement by the piston exerts a force on the link 61 tending to move the pivot 62' to the left and such force is thus transmitted to the shaft 58 and back to the clutch pedal so that the operator's foot is sensitive to the reaction which he must offset by maintaining a certain pressure so long as he wants the power means to apply. Otherwise the shaft 58 would be moved back to a position where the recess 77 would be closed to the port 75 and thus disconnect the manifold from the power cylinder. Upon release of the clutch pedal, the springs 20' will move the clutch into engagement and the piston will return to the position shown in Fig. 2 carrying the attached mechanism therewith.

It will be seen that the clutch can be disconnected by a power operated mechanism which is controlled by a selector means in cooperation with mechanism connected with the accelerator pedal or with mechanism connected with the clutch pedal, and that the clutch can be disengaged manually when the power means is not effective.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a power mechanism for releasing a clutch, control mechanism comprising three manually operative valve means, one of said valve means cooperating selectively with either of the other valve means to make the power mechanism effective.

2. In a motor vehicle, the combination with power mechanism for releasing a clutch, of control means comprising a pair of independent valve mechanisms and a selector valve means cooperative with either mechanism of the pair of valve mechanisms to make the power mechanism effective.

3. In a motor vehicle, the combination with power mechanism for releasing a clutch, of control means comprising clutch pedal operated mechanism, accelerator pedal operated mechanism, and selector means cooperative with either said clutch operated mechanism or said accelerator pedal operated mechanism to make the power mechanism effective.

4. In a motor vehicle, the combination with power mechanism for actuating clutch release mechanism, of control means comprising clutch pedal operated mechanism, a second manually operable mechanism, and selector means cooperative with either said clutch pedal operated mechanism or said second manually operable mechanism to make the power mechanism effective.

5. In a motor vehicle, the combination with a power operated clutch releasing mechanism having a power conduit with two effective connections, of control means comprising three valves adjustable to selectively open or close the conduit connections, clutch pedal actuated mechanism connected to one of the valves, and manually operable mechanisms connected to the other valves.

6. In a motor vehicle, the combination with a power operated clutch releasing mechanism having power conduit means, of control means for the mechanism comprising three valves, one of said valves being a selector and cooperating with either one of the other two valves to open and close the conduit means, hand operated mechanism connected to adjust the selector valve, clutch pedal operated mechanism connected to adjust the second valve, and accelerator pedal operated mechanism connected to adjust the third valve.

7. In a motor vehicle, the combination with a power operated clutch releasing mechanism having a power conduit means, of control means for the mechanism comprising a pair of valve members adjustable to open and close the conduit means, hand operated mechanism connected to adjust one of said valves, and clutch pedal operated mechanism connected to adjust the other valve, said last mentioned mechanism being associated with the clutch release mechanism to divert some of the power load to the clutch pedal during de-clutching position.

8. Clutch releasing mechanism comprising a movable power actuator element, a stationary element cooperatively associated with said movable element, a mechanical connection between the movable element and the clutch, a power connection leading to said stationary element, a valve housing in said power connection having an interior port, a second power connection leading to the housing, a housing in said second connection, a manually operable valve in said last mentioned housing for controlling flow therethrough, and a pair of individual manually operable parallel valves in said first mentioned housing on opposite sides of and controlling passage through said internal port, one of said pair of valves selectively controlling communication between either of said connections and the first mentioned housing.

9. Clutch releasing mechanism comprising a movable power actuator element, a stationary element cooperatively associated with said movable element, a mechanical connection between the movable element and the clutch, a power connection leading to said stationary element, a valve housing in said power connection having an interior port, a second power connection leading to the housing, a housing in said second connection, a manually operable valve in said last mentioned housing for controlling flow therethrough, a pair of individual manually operable parallel valves in said first mentioned housing on opposite sides of and controlling passage through said internal port, one of said pair of valves selectively controlling communication between either of said connections and the first mentioned housing, and means connecting the second housing with the mechanical connection.

10. Clutch releasing mechanism comprising a movable power actuator element, a stationary element cooperatively associated with said movable element, a mechanical connection between the movable element and the clutch, a power connection leading to said stationary element, a valve housing in said power connection having an internal port, a second power connection leading to the housing, a housing in said second connection, a manually operable valve in said last mentioned housing, a clutch pedal connected to actuate said valve, a pair of individual manually operable parallel valves in said first mentioned housing arranged to cooperatively control the internal port, an accelerator pedal connected to control one of said pair of valves, a manually operable element connected to control the other of said pair of valves, said last mentioned valve being movable to selectively connect the internal port or the housing in said second connection with said stationary element, and means connecting said second housing with the mechanical connection from the movable element to the clutch.

11. In a motor vehicle, the combination with a power operated clutch releasing mechanism having power conduit means, of control means for the mechanism comprising three chambers, two primary chambers and a third chamber, said primary chamber being directly connected with said conduit means and with the third chamber, a valve in each of said chambers, one of said valves being a selector and cooperating with either one of the other two valves to selectively control the connections between the primary chambers and the third chamber, mechanism operable to adjust the selector valve, mechanism operable to adjust a second valve, and mechanism operable to adjust the third valve.

12. In a motor vehicle, the combination with a power operated clutch releasing mechanism having a power conduit means, of control means for the mechanism comprising a pair of valve members cooperatively adjustable to open and close the conduit means, mechanism operable to adjust one of said valves, and another mechanism operable to adjust the other of said valves, said last mentioned mechanism being associated to direct some of the power load therethrough while the clutch release mechanism is in released position.

13. Clutch releasing mechanism comprising a movable power actuator element, a stationary element cooperatively associated with said movable element, a mechanical connection between the movable element and clutch, a power connection leading to said stationary element, a valve housing in said power connection having an interior port, a second power connection leading to the housing, a housing in said second connection, a manually operable valve in said last mentioned housing adapted to control communication between said second connection and said first mentioned housing, a clutch pedal operative to control said valve and to adjust said mechanical connection between the movable element and the clutch, a pair of individual manually operable parallel valves in said first mentioned housing, one of said pair of valves selectively controlling communication between either of said connections and said stationary element, and means connecting the valve in said second housing with said mechanical connection.

14. Clutch releasing mechanism comprising a movable power piston, a stationary power cylinder in which said piston is movable, a mechanical connection between the piston and the clutch, a power connection leading into one end of said cylinder, a valve housing in said power connection having a pair of spaced chambers connected by an internal port, a pair of valves operable in said chambers and cooperating to control said internal port, and a pair of conduits connecting the end of the cylinder opposite that with which the power connection is associated with the valve housing, said conduits communicating one with each chamber in a relation to be open to atmosphere when the valves are in certain positions of adjustment.

15. Clutch releasing mechanism comprising a movable power actuator element, a stationary element cooperatively associated with said movable element, a mechanical connection between the movable element and the clutch, a power connection leading to said stationary element, a valve housing in said power connection, manually controllable valve means in said valve housing, a second power connection leading to the housing, a housing in said second connection, a manually operable valve in the housing in said second connection, and means connecting said valve in the housing in said second connection with said mechanical connection.

JAMES R. FERGUSON.